United States Patent [19]

Suwyn

[11] 4,395,182

[45] Jul. 26, 1983

[54] FILLING AND DISTRIBUTION APPARATUS AND METHOD FOR SILOS

[76] Inventor: Donald W. Suwyn, 3535 - 108th St., Caledonia, Mich. 49316

[21] Appl. No.: 196,096

[22] Filed: Oct. 10, 1980

[51] Int. Cl.[3] ...................... B65G 3/04; B65G 31/04; B65G 65/32

[52] U.S. Cl. ................................. 414/299; 239/684; 239/689; 414/301; 414/786

[58] Field of Search ............... 414/301, 299, 293, 300, 414/302, 206, 208, 786; 239/689, 684, 681, 665, 436, 1; 406/162, 160, 161, 159

[56] References Cited

U.S. PATENT DOCUMENTS

| | | | |
|---|---|---|---|
| 3,151,720 | 10/1964 | Orr et al. | 414/301 X |
| 3,158,408 | 11/1964 | Cymara | 406/162 X |
| 3,175,668 | 3/1965 | Stoltzfus | 414/301 X |
| 3,230,017 | 1/1966 | Cymara | 406/162 |
| 3,269,780 | 8/1966 | Hanson | 406/162 |
| 3,485,536 | 12/1969 | Donelson | 414/301 X |
| 3,640,409 | 2/1972 | Hanson | 414/301 X |

Primary Examiner—Bruce H. Stoner, Jr.
Attorney, Agent, or Firm—Price, Heneveld, Huizenga & Cooper

[57] ABSTRACT

A method and apparatus are disclosed for forming alternating layers of coarse feed elements and fine feed elements when loading a livestock feed storage structure. The apparatus includes a center fill tube and a movable distributor supported from the center fill tube. The distributor includes a pan and a drive to rotate the pan about a central axis. When positioned in alignment with the center fill tube, feed is distributor filled into the storage structure. When positioned out of alignment with the center fill tube, feed is center filled into the storage structure. Alternating between distributor fill and center fill creates the layering of coarse and fine elements.

11 Claims, 10 Drawing Figures

FILLING AND DISTRIBUTION APPARATUS AND METHOD FOR SILOS

BACKGROUND OF THE INVENTION

The present invention relates to the storage of livestock feed and more particularly to a unique method and apparatus for storing feed which is composed of fine and coarse elements.

Various systems are presently available for the storing of livestock feed. Such feed includes, for example, alfalfa, sorghum-sudan cross Haylage, chopped sorghum heads, sorghum silage, reconstituted hay and corn silage. The systems typically include an elongated, vertically oriented tank, bin or silo as the main storage structure. The structure includes a roof or cover which defines a centrally located access aperture. The aperture is closed and sealed by a hatch. To load the tank, the hatch is opened and feed material is directed to the top of the structure from ground level through a "J" pipe. After loading, the hatch is closed and the structure is essentially sealed. This is done to protect the feed material from oxygen which could result in spoiling.

Typically, the feed stock or material is removed from the tank or silo by a bottom unloader. Various bottom unloaders are presently available. Each type of unloader normally includes a sweeping conveyor or auger which is rotated so as to sweep the bottom of the structure and direct feed to a central opening. A sub-floor conveyor receives the feed from the center of the structure and discharges it through an unloader door. The feed is then directed to the livestock feeding area.

Heretofore, two approaches have been taken in loading such feed storage structures. The first approach or method is to load the feed through the centrally located access aperture. The feed is discharged directly into the tank from the "J" pipe structure. This method is generally referred to as a center fill method. In the second method, the feed is directed towards the sides of the structure by a distributor supported adjacent the outlet of the "J" pipe and within the silo. This method is generally referred to as a distributor fill method.

These methods present significant problems when used to load feed such as high moisture ground ear corn. Such a type of feed is composed of fine elements and lighter, coarse elements. When using a center fill method, the fine elements pack and collect in the center of the silo. The coarse elements, which are lighter, collect adjacent the sides of the silo structure. When bottom unloading techniques are used to unload the silo, the fine elements will be discharged first and feed separation results. The fine elements are separated from the coarse elements.

When a distributor fill method is used, the fine elements will collect and pack at the sides of the structure. The coarse elements flow inwardly due to gravity and air movement and collect in the center column. When unloading a distributor filled silo, a phenomenon referred to as tunneling occurs. The fine elements packed adjacent the sides of the silo are removed and "tunnels" are formed within the structure. A reduced pressure area occurs adjacent the sides of the structure. The tunneling may cause the plates of the silo to buckle in this reduced pressure area. When buckling occurs, personnel must enter the storage structure in order to make the necessary repairs. The repair operation when feed material is present may be extremely dangerous.

SUMMARY OF THE INVENTION

In accordance with the present invention, the aforementioned problems and hazards are essentially eliminated. Separation of the feed material and tunneling when bottom unloading are substantially prevented.

In the method in accordance with the present invention, feed material composed of coarse and fine elements is alternately center filled and distributor filled. The feed is directed to the access aperture at the top of the silo or storage structure. Initially, the feed is distributed in a circular pattern towards the sides of the structure until a predetermined quantity of feed is loaded into the structure. Distributing the feed causes the coarse material to collect towards the center and the fine to collect towards the sides of the structure. After the predetermined quantity of feed material is loaded into the silo, a center fill step is employed. Another predetermined quantity of feed is loaded into the structure causing the fine elements to collect adjacent the center and the coarse elements to collect towards the sides of the silo. The steps of distributor filling and center filling are alternated until the silo is loaded. The method results in formation of a plurality of layers of coarse and fine material throughout the silo. This eliminates tunneling and feed separation when bottom unloading.

The apparatus in accordance with the present invention essentially includes a distributor means movable between a first operating position and a second nonoperating position. When in the first operating position, the distributor means directs the feed towards the sides of the storage structure. After a predetermined quantity of feed is loaded, means are provided for moving the distributor out of its first position to a second position at which center filling may be achieved.

In the preferred embodiment in accordance with the present invention, the distributor means is pivotally secured to a center fill pipe which is suspended within the access aperture at the top of the silo structure. The distributor means includes a first tube which is pivotally secured to the center fill pipe and a second tube rotatably mounted on the first tube and which supports a distributor pan. The pan is secured to the second tube at an angle with respect to the central axis of the tubes. A drive means is provided for rotating the second tube and hence the pan with respect to the first tube. Provision is made for shifting the distributor between its first and second positions from ground level. Further, a control system is provided which actuates the distributor only when it is in the first position.

The apparatus in accordance with the present invention readily achieves the alternating layer effect when filling feed having coarse and fine elements into a silo structure. The apparatus eliminates feed separation and tunneling problems heretofore experienced upon removal. As a result, formation of areas of reduced pressure within the silo during bottom unloading is eliminated. The chance of and occurrence of collapse or buckling of the side plates of the silo are substantially reduced or eliminated. The apparatus in accordance with the present invention is relatively easily and inexpensively manufactured, easy to operate and reliable in use.

DETAILED DESCRIPTION OF THE PREFERRED EMBODIMENT

Figure 1:
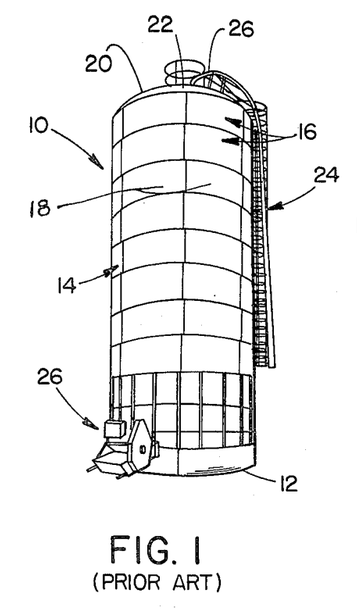
FIG. 1 is a perspective view of a feed storage structure.
Figure 2:
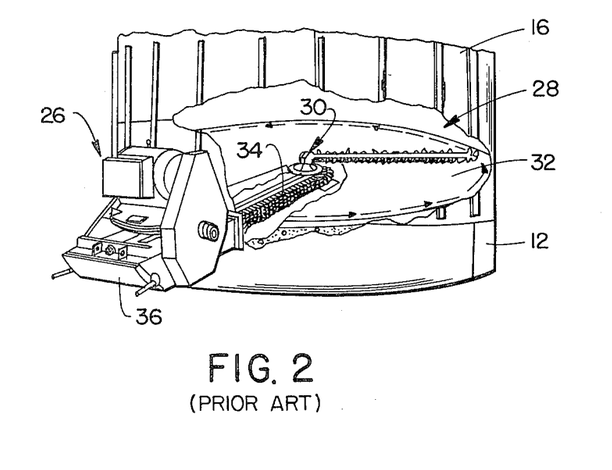
FIG. 2 is an enlarged fragmentary, perspective view of the bottom of the feed storage structure showing a bottom unloading apparatus.
Figure 10:
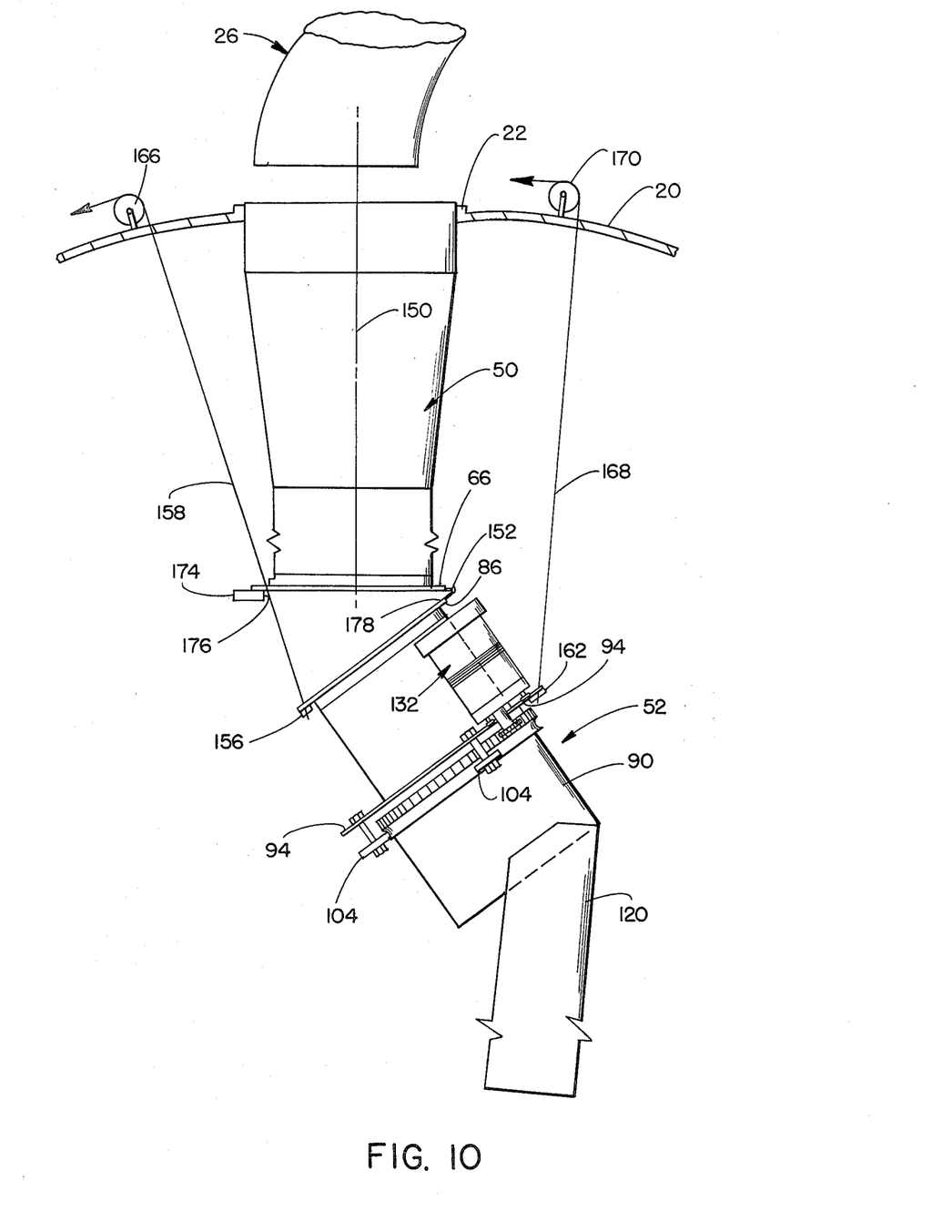
FIG. 10 is an enlarged, fragmentary, partially sectioned, elevational view illustrating the apparatus in accordance with the present invention mounted within an access aperture in the roof of a silo or other feed storage structure.

With reference to the drawings, FIGS. 1 and 2 illustrate a conventional, commercially available feed storage structure which is generally designated 10. Structure 10 includes a foundation 12 and an elongated, vertically oriented tank 14. Tank 14 is fabricated from a plurality of rings 16. Each ring 16 is defined by a plurality of bolted or otherwise interconnected sheets 18. A roof 20 is secured to the uppermost ring of tank 14. An access aperture 22 is defined in the center of the roof structure (FIG. 10). The access aperture is typically closed by a pivotal filler hatch (not shown). When the hatch is closed around the access aperture, it is sealed. As a result, oxygen will not enter the top of the structure. An elongated fill member or "J" pipe 24 is secured to tank 14. An upper end 26 of pipe 24 is positioned in line with and directly above access aperture 22 in roof 20 of the tank. Feed is directed to the top of the tank through "J" pipe 24 from ground level through conventional fill mechanisms.

The feed storage structure or silo 10 illustrated in FIG. 1 is of the bottom unloader type and includes an unloader mechanism generally designated 26 in FIGS. 1 and 2. As seen therein, the unloader includes a sweep arm 28 which rotates about a center point 30 and "sweeps" the floor 32 of the silo. When arm 28 is rotated to sweep the floor, it directs feed inwardly to the center of floor 32. The feed is then received in a subfloor conveyor 34 which directs the feed to an unloader door 36. The unloader 26 illustrated in FIG. 2 is a commercially available mechanism which is generally referred to as a chain-type sweep arm unloader. The unloader is marketed by A. O. Smith Harvestore Products, Inc., under the brand name Hercules. Other bottom unloader devices are commercially available. These unloaders also include some form of sweep arm which directs feed to the center of the floor of the silo for unloading by a sub-floor discharge conveyor or auger structure.

Figure 3:
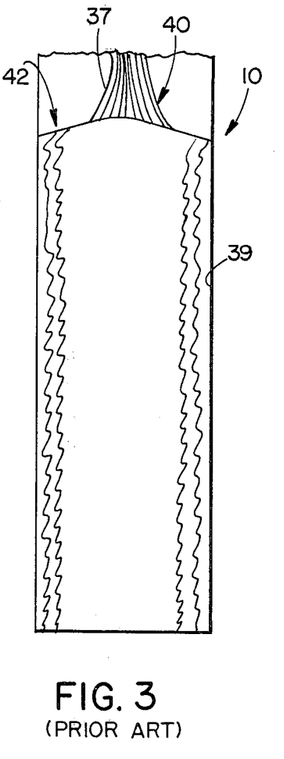
FIG. 3 is a schematic illustration of a center filled silo wherein fine elements are packed in the center and coarse elements are collected along the sides of the structure.

FIG. 3 is a schematic illustration of a silo 10 which has been filled with a feed 37 which includes fine elements and lighter, coarse elements. The feed has been loaded into the silo 10 by a center fill method wherein it is directed through and coaxial with the center aperture 22 of roof 20. When center filled, the fine elements generally designated 40 collect and pack in the center of silo 10. The coarse elements which are generally designated 42 will flow towards the interior side surface or sides 39 of silo 10 due to gravity and air movement. When a silo 10, as illustrated in FIG. 3, is unloaded with a bottom unloader, the fine elements which are in the center and directly above the center unloading point of the silo will be unloaded first and faster than the coarse elements. This results in separation of the fine elements from the coarse elements. Before the unloaded feed can be fed to the livestock, it should be mixed so that it contains a reasonably even mixture of fine and coarse elements. The center fill method, therefore, does not provide a uniform quality feed when the feed is composed of fine elements and coarse elements. This is particularly acute with high moisture content ground ear corn feed.

Figure 4:
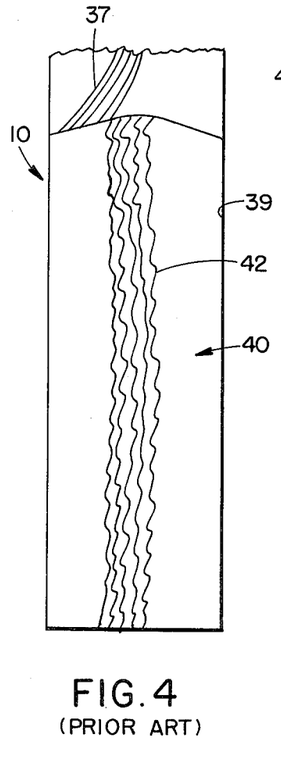
FIG. 4 is a schematic illustration of a distributor filled silo wherein the coarse elements are collected in the center and fine elements are collected adjacent the sides of the structure.

FIG. 4 illustrates a silo 10 which has been filled with a distributor fill method. In such a method, a rotating distributing plate is positioned at the access aperture on the roof and the feed stock comes into contact with the plate after leaving the outlet of the "J" pipe 26. As the plate rotates, feed 37 is directed towards the sides 39 of the silo. With high moisture content ground ear corn which is composed of fine elements and coarse elements, the fine elements tend to collect in an annular fashion adjacent the sides of the silo and the coarse elements will flow inwardly and collect in a central column. The fine elements in FIG. 4 are also generally designated 40, and the column of coarse elements is generally designated 42. When bottom unloading feed from the silo, schematically illustrated in FIG. 4, the fine elements 40 will be removed at a faster rate than the coarse elements. As a result, "tunnels" will occur adjacent sides 39 of the silo 10. This tunneling can result in a reduction in pressure or creation of a partial vacuum immediately adjacent the silo plates 18. The reduced pressure area can cause buckling of the plates in the individual rings 16 of the silo structure. When such buckling occurs, personnel must enter the silo from the top thereof in order to effect repairs. This can be a hazardous job if feed material remains in the silo.

Figures 5, 6, 7, 8, 9:
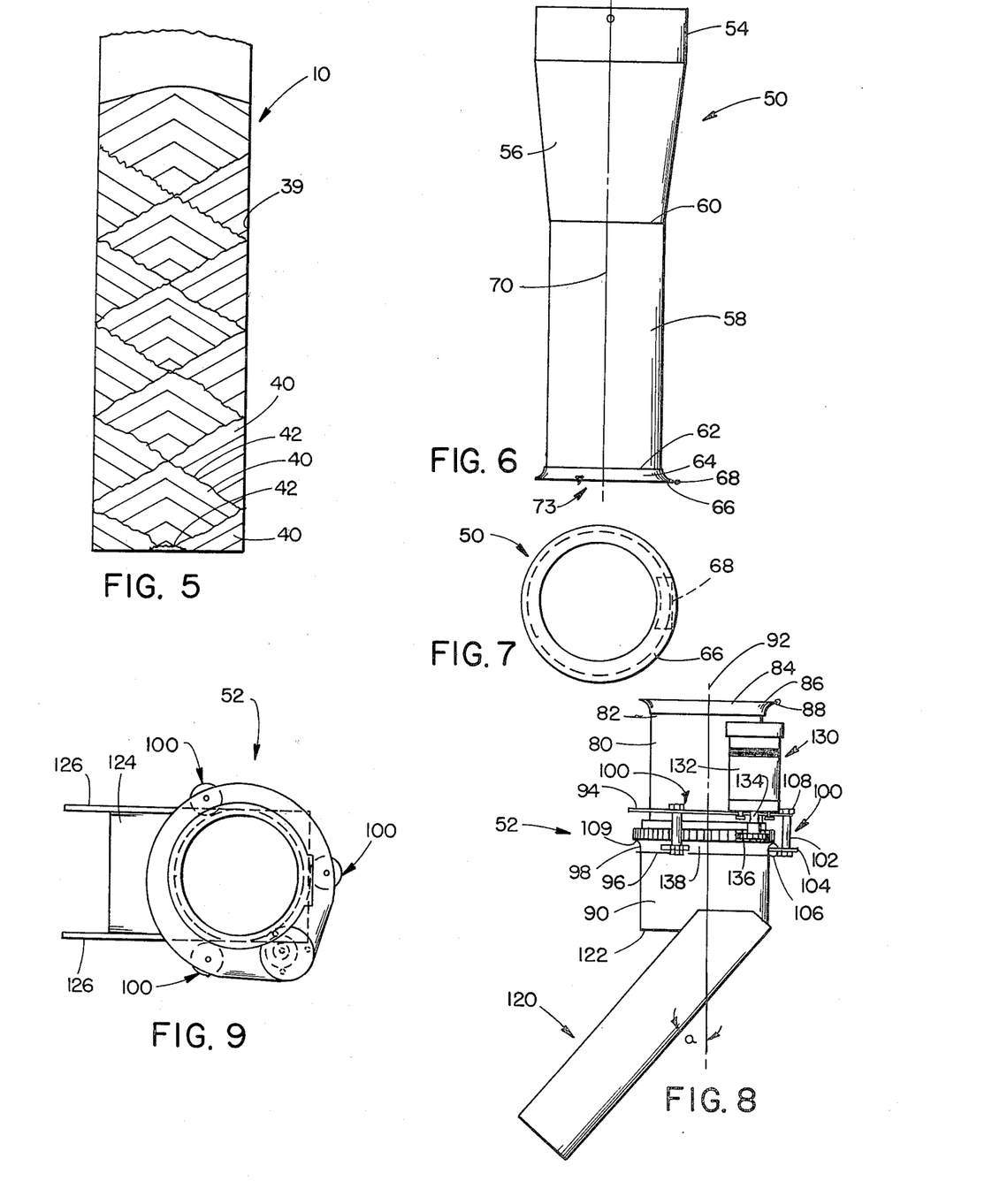
FIG. 5 is a schematic illustration of the layer effect created by loading feed material in accordance with the present invention.
FIG. 6 is an elevational view of a center fill pipe employed in the present invention.
FIG. 7 is a top plan view of the center fill pipe.
FIG. 8 is a side elevational view of a distributor means in accordance with the present invention.
FIG. 9 is a top plan view of the distributor means of FIG. 8.

In accordance with the present invention, a method is provided whereby the center packing of fine elements or the side packing of fine elements, as illustrated in FIGS. 3 and 4, respectively, is eliminated. The method produces a layering effect, which is schematically illustrated in FIG. 5. As shown in FIG. 5, the method in accordance with the present invention produces alternating layers of fine elements 40 and coarse elements 42. This layering effect eliminates feed separation during bottom unloading and eliminates a center column of coarse material, thereby eliminating the tunneling phenomenon referred to above. In the method in accordance with the present invention, a predetermined quantity of feed is initially loaded into silo 10 by a distributor fill method of loading. This step causes coarse material 42 to initially be located adjacent the center of the structure. The coarse material will be surrounded by a ring-like quantity of fine material 40. After the predetermined quantity is filled into the silo, a center fill method is employed until another predetermined quantity is loaded. The center fill method causes fine elements 40 to collect adjacent the center and the coarse elements 42 to collect along a line towards the sides 39 of the silo. The distributor fill and center fill steps are alternated until the silo is loaded. It is presently preferred that approximate equal quantities be alternately distributor filled and center filled. When loading high moisture, ground ear corn in a 20' diameter structure, it is presently preferred that forty (40) ton quantities of feed are alternately loaded by the method. This produces the layering which is schematically illustrated in FIG. 5.

The layering insures that a mix of the fine and coarse elements are unloaded during bottom unloading. The undesirable separation problem heretofore experienced with center filling only is eliminated. Further, since a center column of coarse elements surrounded by a ring of fine elements is not produced by the subject method, harmful tunneling is eliminated. The collapse or buckling problems heretofore noted are substantially eliminated.

Apparatus in accordance with the present invention for loading a silo in the alternating layers of coarse and fine material is illustrated in FIGS. 6-9. The apparatus includes a center fill tube 50 illustrated in FIGS. 6 and 7 and a distributor means 52 illustrated in FIGS. 8 and 9. Center fill tube 50, in the preferred embodiment, includes an upper annular ring 43 which is joined to a tapered tubular section 56. An elongated, cylindrical section 58 is joined to a lower end 60 of the tapered portion 56. A lower end 62 of cylindrical element 58 has secured thereto a hub 64 having an annular flange 66 integral therewith. Secured to flange 66 is a first hinge plate 68. As explained below, the center fill tube 50 is positionable in and through the access aperture in the roof of the silo. Elements 54, 56, 58 and 64 all have a common central axis generally designated 70 in FIG. 6. Center fill pipe or tube 50 has an inlet end 71 and discharge or outlet end 73.

Distributor means 52, as best seen in FIGS. 8 and 9, includes a first generally cylindrical tube 80 having an upper open inlet end 2. A flanged hub 84 is welded or otherwise secured to the upper end 82 of tube 80. Flanged hub 84 includes a radial flange 86 which supports a second hinge plate 88. Distributor means 52 further includes a second generally cylindrical tubular member 90. In the embodiment illustrated, tubular member 90 telescopes over the lower end of tube 80. Tube 80 is coaxially aligned with tube 90 and shares therewith a common central axis generally designated 92 in FIG. 8. A mounting ring 94 is welded or otherwise secured to and extends around the outer periphery of tube 80 adjacent its lower or discharge end. A channel-shaped member 96 defines a radially opening track 98. Member 96 is secured to and extends around the outer periphery of tube 90. Tube 90 is rotatably supported from tube 80 by a plurality of bearing support members or assemblies 100. Each bearing support assembly 100 includes a central tubular bushing or elongated element 102. Positioned at the lower end of element 102 is a generally circular bearing 104. A bolt 106 passes up through bearing 104, through tubular bushing 102 and through mounting ring 94. A nut 108 is threaded to the end of bolt 106. As a result, bearing elements 104 are rigidly secured and suspended from mounting ring 94. As best seen in FIG. 9, each bearing element 104 is disposed within the radially opening track 98 defined by channel member 96. An upper sidewall 109 of channel member 96 rests on an upper surface 110 of each bearing element. As a result, tube 90 is suspended from tube 80. Tube 90 may rotate to tube 80 about the common central axis 92.

As best seen in FIG. 8, a distributor plate or pan subassembly 120 is secured to tube 90 at its discharge end or outlet end 122. Pan 120 is generally channel-shaped in cross section and includes a plate or base portion 124 and vertical sides 126. Pan 120 is welded or otherwise suitably secured to the lower end of tube 90 so that feed passing downwardly through tubes 80, 90 will contact base portion 124 of pan 120. As seen in FIG. 8, pan 120 is mounted at an angle generally designated "a" with respect to the centerline 92 of tubes 80, 90. In a presently existing embodiment, angle "a" is approximately 40°.

A drive means generally designated 130 is provided to rotate tube 90 and hence pan 120 with respect to tube 80. In the presently preferred embodiment, drive 130 includes an electric motor 132 bolted or otherwise suitably secured to mounting ring or plate 94. Motor 132 includes an output shaft 134 which extends through plate 94. Nonrotatably secured to output shaft 134 is a gear or sprocket 136. Extending around the entire periphery of tube 90 is a roller chain 138. Gear or sprocket 136 meshes with roller chain 138. As a result, rotation of gear 138 causes rotation of tube 90 with respect to tube 80. In the alternative, a ring gear could be used instead of the roller chain 138, as illustrated in FIG. 8. Other drive interconnections could be employed, such as a belt and pulley arrangement.

When in its first operating position, pan 120 will rotate about axis 92. Feed will contact pan 120 and be directed in a circular pattern radially of axis 92. When in the operating position, axis 92 is coextensive with axis 70 and axis 150.

FIG. 10 schematically illustrates apparatus in accordance with the present invention mounted within a silo. Roof 20 defines the access aperture 22. The "J" pipe end portion 26 is positioned immediately above and coaxial with a central axis 150 of aperture 22. Center fill pipe 50 is secured or suspended by any suitable means within the aperture 22. The distributor means 52 is pivotally secured to flange 66 of center fill pipe 50 by a pivot pin 152 passing through the first and second hinge plates 68, 88.

Distributor means 52 may be moved from a first position wherein flange 86 is moved into abutting contact with flange 66. Distributor means 52 may also be rotated counterclockwise, as viewed in FIG. 10, to a position at which it is completely out of the way of the outlet end of the center fill pipe 50. As shown in FIG. 10, means 52 is intermediate such first and second positions.

In accordance with the present invention, provision is made for shifting the distributor means 52 between its first and second positions from ground level. As seen in FIG. 10, a cable 158 passes through flange 86 and is secured by a clamp 156. Cable 158 passes upwardly through roof 20 and over a pulley assembly 166 secured to roof 20. Cable 158 then passes over the side of the roof and downwardly to ground level. A cable 168 is connected to mounting plate 94 by a clamp 162 and passes upwardly through roof 20 and over a pulley assembly 170. Cable 168 then passes over the side of the silo structure to ground level. In the alternative, the pulley assemblies could be secured to the center fill pipe and the cables could pass out through aperture 22.

As should be readily apparent, when the operator pulls on cable 158, distributor means 52 will be pivoted clockwise, when viewed in FIG. 10, until flange 86 contacts flange 66. When in this position, motor 132 may be actuated causing pan 120 and tube 90 to rotate to distributor fill the silo. It is presently preferred that a switch 174 be supported on a suitable bracket at flange 66 on the center fill pipe 50. The switch is positioned so that a contact 176 is shifted when flange 86 moves into abutment with flange 66. Electrical motor 132 is electrically connected to a source of power through switch 174 so that it will be automatically actuated when distributor means 52 is placed in its operating position. It is also presently preferred that an indicator light be connected through the switch to indicate to the operator that the motor is actuated.

When the operator releases cable 158 and pulls on cable 168, distributor 52 will be rotated in a counter-clockwise direction, when viewed in FIG. 10. Distributor 52 is then positioned so that the top surface 178 of flange 86 is parallel with the central axis 150 of aperture 22. When in this position, feed entering the center fill pipe 50 from the "J" pipe outlet 26 will pass directly into the center of the silo for center fill loading.

The apparatus in accordance with the present invention therefore permits the operator to selectively alternate between center fill and distributor fill methods of loading the silo. Thus, the operator may readily create the layered effect schematically illustrated in FIG. 5 which eliminates tunneling and feed separation problems during bottom unloading operations. When in position, the apparatus is easily operated from the ground. Due to its construction, it is reliable in use and extremely rugged. The elements are dimensioned to fit within the access aperture 22 of conventional silos. The center fill pipe is easily slipped through the aperture and supported at the roof 20 of the silo. Through the control circuitry, the operator is provided with a ready indication that the distributor is operating and that it is rotating in a circular path about central axis 150 to distribute the feed in the silo.

In a presently existing embodiment of the apparatus in accordance with the present invention, motor 132 is a 1/20 h.p. motor which operates on 110 volt AC current. The motor rotates at a nominal speed of 6 revolutions per minute. The roller chain 138 is a ⅜ inch pitch chain which is welded to tube 90 and is meshed with the gear or sprocket 136 which is preferably a 16 tooth sprocket also having a ⅜ inch pitch. All of the elements are readily fabricated from steel and easily assembled employing conventional welding techniques.

In view of the foregoing description, those of ordinary skill in the art will undoubtedly envision various modifications which would not depart from the inventive concepts disclosed herein. For example, a drive motor or drive means other than the electric motor, sprocket and chain may be used to rotate the distributor pan 120. Further, other provision could be made for moving the distributor means 52 between its first and second positions. For example, a mechanism could be employed which would slide distributor means 52 out of alignment with the center fill pipe 50 as opposed to the pivoting motion illustrated in FIG. 10.

Therefore, it is expressly intended that the above description should only be considered as that of preferred embodiment. The true spirit and scope of the present invention may be determined by reference to the appended claims.

The embodiments of the invention in which an exclusive property or privilege is claimed are defined as follows:

1. Apparatus for selectively center filling and distributor filling a feed storage structure, the structure being of the type including a roof having an access aperture, said apparatus comprising:
   a center fill tube having a central axis, an upper inlet end and a lower discharge end, said fill tube dimensioned to fit through the access aperture;
   feed distributor means selectively positionable at the discharge end of the center fill tube for distributing feed in a generally circular pattern radially of the central axis of the fill tube;
   support means connected to said feed distributor means for supporting said distributor means in a first operative position in line with said center fill tube and in a second inoperative position out of alignment with said center fill tube; and
   positioning means connected to said feed distributor means for selectively moving said distributor means between said first operative position in line with said center fill tube to said second inoperative position out of alignment with said center fill tube after a predetermined quantity of feed is loaded into the feed storage structure and from said second position to said first position after another predetermined quantity of feed is loaded into the feed storage structure, said positioning means including a cable having an end secured to said feed distributor means, said cable having a length sufficient to pass out of the feed storage structure to an operator, and wherein said feed distributor means comprises:
   a first tube having a central axis, an inlet end and an outlet end;
   a second tube having a central axis, an inlet end and an outlet end, said second tube being positioned in telescoping relationship with said first tube;
   means for rotatably supporting said second tube on said first tube;
   drive means engaging said second tube for rotating said second tube with respect to said first tube, said drive means including a drive motor mounted on one of said first and second tubes, said drive motor having an output shaft; and
   a pan secured to said second tube at its outlet end and positioned at an angle with respect to the central axis of said second tube so that when said distributor means is in the first operative position, feed will be directed by the pan radially outwardly from the central axis of said second tube, said feed distributor means is dimensioned to fit within the access aperture of the feed storage structure, said means for rotatably supporting said second tube comprises:
   an annular mounting ring secured to said first tube adjacent its outlet end;
   a channel-shaped ring secured to said second tube adjacent its inlet end; and
   a bearing secured to said mounting ring and riding within said channel-shaped ring so that said second tube is rotatably supported from said first tube, and wherein said drive means further comprises:
   means interconnecting said output shaft of said drive motor to said second tube for rotating said second tube as said output shaft rotates, and wherein said apparatus further includes:

control means operatively connected to said drive motor so that said drive motor may be actuated only when said distributor means is in said first position.

2. Apparatus as defined by claim 1 wherein said means interconnecting said output shaft to said second tube comprises:
   an elongated roller chain secured to and extending around the entire outer periphery of said second tube; and
   a gear engaging said roller chain, said gear bearing nonrotatably secured to said output shaft.

3. Apparatus for selectively center filling and distributor filling a feed storage structure, said apparatus comprising:
   a center fill tube having a central axis, an upper inlet end and a lower discharge end;
   feed distributor means selectively positionable at the discharge end of the center fill tube for distributing feed in a generally circular pattern radially of the central axis of the fill tube; and
   support means connected to said feed distributor means for supporting said distributor means in a first operative position in line with said center fill tube and in a second inoperative position out of alignment with said center fill tube, wherein said feed distributor means comprises:
   a first tube having a central axis, an inlet end and an outlet end;
   a second tube having a central axis, an inlet end and an outlet end, said second tube being positioned in telescoping relationship with said first tube;
   means for rotatably supporting said second tube on said first tube;
   drive means engaging said second tube for rotating said second tube with respect to said first tube; and
   a pan secured to said second tube at its outlet end and positioned at an angle with respect to the central axis of said second tube so that when said distributor means is in the first operative position, feed will be directed by the pan radially outwardly from the central axis of said second tube, wherein said means for rotatably supporting said second tube comprises:
   an annular mounting ring secured to said first tube adjacent its outlet end;
   a channel-shaped ring secured to said second tube adjacent its inlet end; and
   a bearing secured to said mounting ring and riding within said channel-shaped ring so that said second tube is rotatably supported from said first tube, wherein said drive means comprises:
   a drive motor mounted on said mounting ring, said motor having an output shaft; and
   means interconnecting said output shaft to said second tube for rotating said second tube as said output shaft rotates, wherein said means interconnecting said output shaft to said second tube comprises:
   an elongated roller chain secured to and extending around the entire outer periphery of said second tube;
   a gear engaging said roller chain, said gear being nonrotatably secured to said output shaft;
   positioning means connected to said distributor means for selectively moving said distributor means between said first operative position at which the central axis of said center fill tube, said first tube and said second tube are essentially aligned and said second inoperative position at which said distributor means is moved away from said center fill tube discharge end so that feed will pass directly into the feed storage structure from said center fill tube; and
   control means operatively connected to said drive motor so that said drive motor may be actuated only when said distributor means is in said first position.

4. Apparatus for selectively center filling and distributor filling a feed storage structure, said apparatus comprising:
   a center fill tube having a central axis, an upper inlet end and a lower discharge end;
   feed distributor means selectively positionable at the discharge end of the center fill tube for distributing feed in a generally circular pattern radially of the central axis of the fill tube;
   support means connected to said feed distributor means for supporting said distributor means in a first operative position in line with said center fill tube and in a second inoperative position out of alignment with said center fill tube; and
   positioning means connected to said feed distributor means for selectively moving said distributor means between said first operative position in line with said center fill tube and said second inoperative position out of alignment with said center fill tube, wherein said feed distributor means comprises:
   a first tube having a central axis, an inlet end and an outlet end;
   a second tube having a central axis, an inlet end and an outlet end positioned in telescoping relationship with said first tube;
   means for rotatably supporting said second tube on said first tube;
   drive means engaging said second tube for rotating said second tube with respect to said first tube; and
   a plate secured to said second tube at its outlet end and positioned at an angle with respect to the central axis of said second tube so that when said distributor means is in the first operative position, feed will be directed by the plate radially outwardly from the central axis of said second tube, wherein said means for rotatably supporting said second tube comprises:
   an annular mounting ring secured to said first tube adjacent its outlet end;
   a channel-shaped ring secured to said second tube adjacent its inlet end; and
   a bearing secured to said mounting ring and riding within said channel-shaped ring to that said second tube is rotatably supported from said first tube, wherein said drive means comprises:
   a drive motor mounted on said mounting ring, said motor having an output shaft; and
   means interconnecting said output shaft to said second tube for rotating said second tube as said output shaft rotates, wherein said means interconnecting said output shaft to said second tube comprises:
   an elongated roller chain secured to and extending around the entire outer periphery of said second tube; and
   a gear engaging said roller chain, said gear being nonrotatably secured to said output shaft, wherein said positioning means comprises:

a first cable having an end secured to said annular mounting ring, said cable having a length sufficient for it to pass out of said feed storage structure to ground level; and a second cable having an end secured to said distributor means at a point opposite said end of said first cable, said second cable having a length sufficient for it to pass out of said feed storage structure to ground level.

5. Apparatus as defined by claim 4 wherein said support means comprises:

a first hinge plate mounted on said center fill tube at its discharge end;

a second hinge plate mounted on said first tube of said distributor means; and a hinge pin extending through said first and second hinge plates whereby said distributor means is pivotally supported to said center fill tube.

6. A method of top filling a feed storage structure with feed having coarse and fine elements, said structure being of the type which includes an elongated, generally cylindrical tank defining an interior side surface, a closed top having a centrally located access aperture and a bottom discharge aperture, said method comprising the steps of:

directing feed from ground level to said access aperture;

distributing said feed in a circular pattern and towards the interior side surfaces of said cylindrical tank until a predetermined quantity of feed is loaded into said structure;

center filling feed into said structure through said access aperture until another predetermined quantity of feed is loaded into said structure; and repeating said distributing and center filling steps until said structure is fully loaded so that alternating layers of coarse feed elements and fine feed elements are formed within said structure.

7. A method as defined by claim 6 wherein said distributing step includes the step of:

placing a pan within said structure at an angle with respect to a central axis of said access aperture so that feed directed through said aperture will contact said pan and be directed radially outwardly from the central axis of said aperture and towards the interior side surface of said structure.

8. A method as defined by claim 7 wherein said distributing step further includes the step of:

rotating said pan about said central axis to uniformly distribute the feed.

9. A method as defined by claim 8 wherein said step of center filling comprises the steps of:

moving said pan away from said central axis to a position where feed directed to the access aperture does not contact said pan; and directing feed into said structure along the central axis of said aperture.

10. A method as defined by claim 9 wherein said a predetermined quantity of feed is substantially equal to said another predetermined quantity of feed.

11. A method as defined by claim 9 wherein said a predetermined quantity of feed and said another predetermined quantity of feed are both equal to approximately forty tons of feed.

* * * * *

UNITED STATES PATENT AND TRADEMARK OFFICE
CERTIFICATE OF CORRECTION

PATENT NO. : 4,395,182

DATED : July 26, 1983

INVENTOR(S) : Donald W. Suwyn

It is certified that error appears in the above-identified patent and that said Letters Patent is hereby corrected as shown below:

Column 5, line 28:

"43" should be --54--;

Column 5, line 42:

"2" should be --82--;

Column 9, Claim 2, line 11:

"bearing" should be --being--; and

Column 10, Claim 4, line 54:

"to" should be --so--.

Signed and Sealed this

Fourth Day of December 1984

[SEAL]

Attest:

GERALD J. MOSSINGHOFF

Attesting Officer

Commissioner of Patents and Trademarks